US012750847B2

(12) United States Patent
Kim

(10) Patent No.: US 12,750,847 B2
(45) Date of Patent: Sep. 29, 2026

(54) METHOD AND APPARATUS FOR PERFORMING PHYSICAL UPLINK SHARED CHANNEL TRANSMISSION IN NON-TERRESTRIAL NETWORK

(71) Applicants: BLACKPIN Inc., Seoul (KR); Soenghun Kim, Hanam-si (KR)

(72) Inventor: Soenghun Kim, Hanam-si (KR)

(73) Assignees: BLACKPIN INC., Seoul (KR); Soenghun Kim, Hanam-si (KR)

( * ) Notice: Subject to any disclaimer, the term of this patent is extended or adjusted under 35 U.S.C. 154(b) by 371 days.

(21) Appl. No.: 18/599,246

(22) Filed: Mar. 8, 2024

(65) Prior Publication Data

US 2024/0215022 A1 Jun. 27, 2024

Related U.S. Application Data

(63) Continuation of application No. PCT/KR2022/019584, filed on Dec. 5, 2022.

(30) Foreign Application Priority Data

Dec. 14, 2021 (KR) ........................ 10-2021-0178945

(51) Int. Cl.
*H04W 72/1268* (2023.01)
*H04L 27/26* (2006.01)
(Continued)

(52) U.S. Cl.
CPC ... *H04W 72/1268* (2013.01); *H04L 27/26025* (2021.01); *H04W 56/0045* (2013.01); *H04W 74/0841* (2013.01)

(58) Field of Classification Search
CPC ......... H04W 74/0841; H04W 72/1268; H04W 72/1263; H04W 48/12; H04W 84/06;
(Continued)

(56) References Cited

U.S. PATENT DOCUMENTS

2020/0329436 A1 10/2020 Liu et al.
2021/0307108 A1 * 9/2021 Babaei .................. H04W 76/18
(Continued)

FOREIGN PATENT DOCUMENTS

KR 10-2020-0040193 A 4/2020
KR 10-2020-0143127 A 12/2020
(Continued)

OTHER PUBLICATIONS

3GPP TS 38.331 V16.7.0 (Dec. 2021); Technical Specification; 3rd Generation Partnership Project; Technical Specification Group Radio Access Network; NR; Radio Resource Control (RRC) protocol specification(Release 16).
(Continued)

*Primary Examiner* — Phong La
(74) *Attorney, Agent, or Firm* — Nicholas Park

(57) ABSTRACT

A method and apparatus for operation in NTN is provided. Method for operation in NTN includes receiving system information including a first common offset1 in the first NR cell, transmitting the PUSCH of the first NR cell in the PUSCH transmission slot determined based on the first common offset1, receiving an RRC control message including a second common offset1 in the first NR cell and transmitting the PUSCH of the second NR cell in the PUSCH transmission slot determined based on the second common offset1.

20 Claims, 10 Drawing Sheets

(51) Int. Cl.
*H04W 56/00* (2009.01)
*H04W 74/0833* (2024.01)

(58) Field of Classification Search
CPC ............... H04W 8/24; H04W 74/0833; H04W 52/0206; H04W 56/0045; H04W 56/004; H04W 56/00; H04L 27/26025; H04L 27/2602; H04L 27/2604; H04L 5/003
See application file for complete search history.

(56) References Cited

U.S. PATENT DOCUMENTS

| | | | | |
|---|---|---|---|---|
| 2021/0329518 | A1 | 10/2021 | Sharma et al. | |
| 2021/0345124 | A1* | 11/2021 | Myung | H04L 27/0006 |
| 2022/0029659 | A1* | 1/2022 | Liu | H04B 1/7143 |
| 2022/0232503 | A1* | 7/2022 | Cheng | H04W 56/009 |
| 2023/0371112 | A1* | 11/2023 | Jeon | H04W 74/006 |
| 2024/0215022 | A1* | 6/2024 | Kim | H04W 74/0841 |
| 2024/0407011 | A1* | 12/2024 | Kim | H04W 74/00 |

FOREIGN PATENT DOCUMENTS

| | | | |
|---|---|---|---|
| WO | 2020-258962 | A1 | 12/2020 |
| WO | 2021-164579 | A1 | 8/2021 |

OTHER PUBLICATIONS

3GPP TS 38.321 V16.7.0 (Dec. 2021); Technical Specification; 3rd Generation Partnership Project; Technical Specification Group Radio Access Network; NR; Medium Access Control (MAC) protocol specification(Release 16).
3GPP TS 38.323 V16.6.0 (Dec. 2021); Technical Specification; 3rd Generation Partnership Project; Technical Specification Group Radio Access Network; NR; Packet Data Convergence Protocol (PDCP) specification (Release 16).
3GPP TS 38.306 V16.6.0 (Sep. 2021); Technical Specification; 3rd Generation Partnership Project; Technical Specification Group Radio Access Network; NR; User Equipment (UE) radio access capabilities (Release 16).
Qualcomm Incorporated, "Open issues in CHO," 3GPP TSG-RAN WG2 Meeting #116-e,E-Meeting, R2-2109971, Nov. 1-12, 2021.
Qualcomm Incorporated,"SMTC and MG enhancements," 3GPP TSG-RAN WG2 Meeting #116e, E-Meeting, R2-2109972, Resubmission of R2-2107566, Nov. 1-12, 2021.
Huawei et al., "Discussion on CHO in NTN," 3GPP TSG RAN WG2 #116-e, Online, R2-2110276, Nov. 1-12, 2021.
Ericsson, "Connected mode aspects for NTN," 3GPP TSG-RAN WG2 Meeting #116 electronic, Online, R2-2110340, Nov. 1-12, 2021.
Nokia et al., "[116-e][103][NTN] SMTC/gaps (Nokia)," 3GPP TSG-RAN WG2 Meeting #116 Electronic, Elbonia, R2-2111333, Nov. 1-12, 2021.
Ericsson, "Stage-3 running RRC CR for NTN Rel-17," 3GPP TSG-RAN WG2 Meeting #116-e, Electronic Meeting , R2-2111337, Nov. 1-12, 2021.
Nokia et al., "[AT116-e][103][NTN] SMTC and gaps (Nokia)," 3GPP TSG-RAN WG2 Meeting #116 Electronic, Elbonia, R2-2111340, Nov. 1-12, 2021.
Nokia et al., "[AT116-e][103][NTN] SMTC and gaps—second phase (Nokia)," 3GPP TSG-RAN WG2 Meeting #116 Electronic, Elbonia, R2-2111353, Nov. 1-12, 2021.
3GPP TS 38.323 V16.5.0 (Sep. 2021); Technical Specification; 3rd Generation Partnership Project; Technical Specification Group Radio Access Network; NR; Packet Data Convergence Protocol (PDCP) specification (Release 16).
International Search Report for International Patent Application No. PCT/KR2022/019584, dated Feb. 24, 2023.
Ericsson, "On Random Access in NTNs," 3GPP TSG-RAN WG2 #113bis_e E-Meeting, R2-2103951 Revision of R2-2101494, Apr. 12-20, 2021.
Ericsson, "On Random Access in NTN," 3GPP TSG-RAN WG2 #112 E-Meeting, R2-2010980 Revision of R2-2010169, Nov. 2-13, 2020.

* cited by examiner

METHOD AND APPARATUS FOR PERFORMING PHYSICAL UPLINK SHARED CHANNEL TRANSMISSION IN NON-TERRESTRIAL NETWORK

CROSS-REFERENCE TO RELATED APPLICATIONS

This application is a continuation of International Application No. PCT/KR2022/019584, filed on Dec. 5, 2022, which claims priority to and the benefit of Korean Patent Application No. 10-2021-0178945, filed on Dec. 14, 2021, the disclosure of which is incorporated herein by reference in its entirety.

BACKGROUND

To meet the increasing demand for wireless data traffic since the commercialization of 4th generation (4G) communication systems, the 5th generation (5G) system is being developed. For the sake of high data rate, 5G system introduced millimeter wave (mmW) frequency bands (e.g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. In addition, in the 5G communication system, a non-terrestrial network is introduced with the goal of supporting a very high data rate and very low transmission delay in order to support various services.

SUMMARY

Aspects of the present disclosure are to address the problems of operation in NTN. Accordingly, an aspect of the present disclosure is to provide a method and an apparatus for operation in NTN. In accordance with an aspect of the present disclosure, a method of a terminal in NTN is provided. In the method, UE receive system information including a first common offset1 in the first NR cell, transmit the PUSCH of the first NR cell in the PUSCH transmission slot determined based on the first common offset1, receive an RRC control message including a second common offset1 in the first NR cell and transmit the PUSCH of the second NR cell in the PUSCH transmission slot determined based on the second common offset1.

DETAILED DESCRIPTION

Figure 1A:
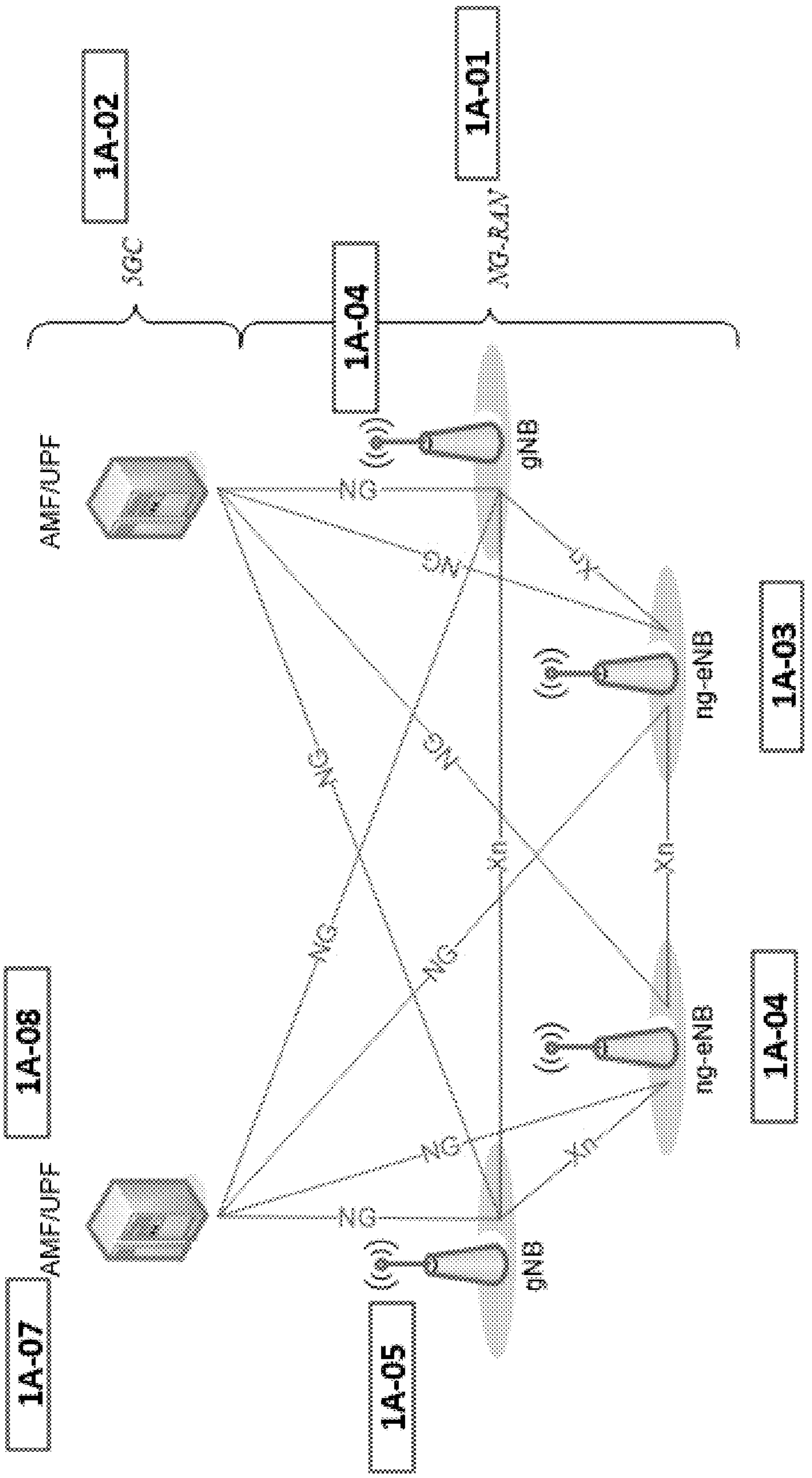
FIG. 1A is a diagram illustrating the architecture of an 5G system and a NG-RAN to which the disclosure may be applied.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name |
|---|---|
| 5GC | 5G Core Network |
| ACK | Acknowledgement |
| AM | Acknowledged Mode |
| AMF | Access and Mobility Management Function |
| ARQ | Automatic Repeat Request |
| AS | Access Stratum |
| ASN.1 | Abstract Syntax Notation One |
| BSR | Buffer Status Report |
| BWP | Bandwidth Part |
| CA | Carrier Aggregation |
| CAG | Closed Access Group |
| CG | Cell Group |
| C-RNTI | Cell RNTI |
| CSI | Channel State Information |
| DCI | Downlink Control Information |
| DRB | (user) Data Radio Bearer |
| DRX | Discontinuous Reception |
| HARQ | Hybrid Automatic Repeat Request |
| IE | Information element |
| LCG | Logical Channel Group |
| MAC | Medium Access Control |
| MIB | Master Information Block |
| NAS | Non-Access Stratum |
| NG-RAN | NG Radio Access Network |
| NR | NR Radio Access |
| PBR | Prioritised Bit Rate |
| PCell | Primary Cell |
| PCI | Physical Cell Identifier |
| PDCCH | Physical Downlink Control Channel |
| PDCP | Packet Data Convergence Protocol |
| PDSCH | Physical Downlink Shared Channel |

TABLE 1-continued

| Acronym | Full name |
|---|---|
| PDU | Protocol Data Unit |
| PHR | Power Headroom Report |
| PLMN | Public Land Mobile Network |
| PRACH | Physical Random Access Channel |
| PRB | Physical Resource Block |
| PSS | Primary Synchronisation Signal |
| PUCCH | Physical Uplink Control Channel |
| PUSCH | Physical Uplink Shared Channel |
| RACH | Random Access Channel |
| RAN | Radio Access Network |
| RA-RNTI | Random Access RNTI |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCell | Secondary Cell |

TABLE 1-continued

| Acronym | Full name |
|---|---|
| SCS | Subcarrier Spacing |
| SDAP | Service Data Adaptation Protocol |
| SDU | Service Data Unit |
| SFN | System Frame Number |
| S-GW | Serving Gateway |
| SI | System Information |
| SIB | System Information Block |
| SpCell | Special Cell |
| SRB | Signalling Radio Bearer |
| SRS | Sounding Reference Signal |
| SSB | SS/PBCH block |
| SSS | Secondary Synchronisation Signal |
| SUL | Supplementary Uplink |
| TM | Transparent Mode |
| UCI | Uplink Control Information |
| UE | User Equipment |
| UM | Unacknowledged Mode |
| CCCH | Common Control Channel |
| DL | Downlink |
| UL | Uplink |
| RAR | Random Access Response |

Table 2 lists the terminologies and their definition used throughout the present disclosure.

TABLE 2

| Terminology | Definition |
|---|---|
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Cell Reselection Priority | Priority of a carrier frequency regarding cell reselection. System Information Block 2 and System Information Block 3 provide the CRP of the serving frequency and CRPs of inter-frequencies respectively. UE consider higher priority frequency for cell reselection if channel condition of the frequency is better than a specific threshold even if channel condition of a lower priority frequency is better than that of the higher priority frequency. |
| Dedicated signalling | Signalling sent on DCCH logical channel between the network and a single UE. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |

TABLE 2-continued

| Terminology | Definition |
|---|---|
| NR | NR radio access |
| PCell | SpCell of a master cell group. |
| registered PLMN | PLMN which UE has registered to |
| selected PLMN | PLMN which UE has selected to perform registration procedure |
| equivalent PLMN | PLMN which is equivalent to registered PLMN. UE is informed of list of EPLMNs by AMF during registration procedure |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| DCCH | DCCH is a logical channel to transfer RRC messages after RRC connection establishment |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above.<br>The cell selection criterion S is fulfilled (i.e. RSRP and RSRQ are better than specific values |

In the present invention, "trigger" or "triggered" and "initiate" or "initiated" can be used interchangeably.

In the present invention, UE and terminal can be used interchangeably. In the present invention, NG-RAN node and base station can be used interchangeably.

FIG. 1*a* is a diagram illustrating the architecture of an 5G system and a NG-RAN to which the disclosure may be applied.

5G system consists of NG-RAN (1*a*-01) and 5GC (1*a*-02). An NG-RAN node is either:

a gNB, providing NR user plane and control plane protocol terminations towards the UE; or an ng-eNB, providing E-UTRA user plane and control plane protocol terminations towards the UE.

The gNBs 1*a*-05 or 1*a*-06 and ng-eNBs 1*a*-03 or 1*a*-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1*a*-07 and UPF 1*a*-08 may be realized as a physical node or as separate physical nodes.

A gNB 1*a*-05 or 1*a*-06 or an ng-eNBs 1*a*-03 or 1*a*-04 hosts the functions listed below.

Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1*a*-07 hosts the functions such as NAS signaling, NAS signaling security, AS security control, SMF selection, Authentication, Mobility management and positioning management.

The UPF 1*a*-08 hosts the functions such as packet routing and forwarding, transport level packet marking in the uplink, QoS handling and the downlink, mobility anchoring for mobility etc.

Figure 1B:
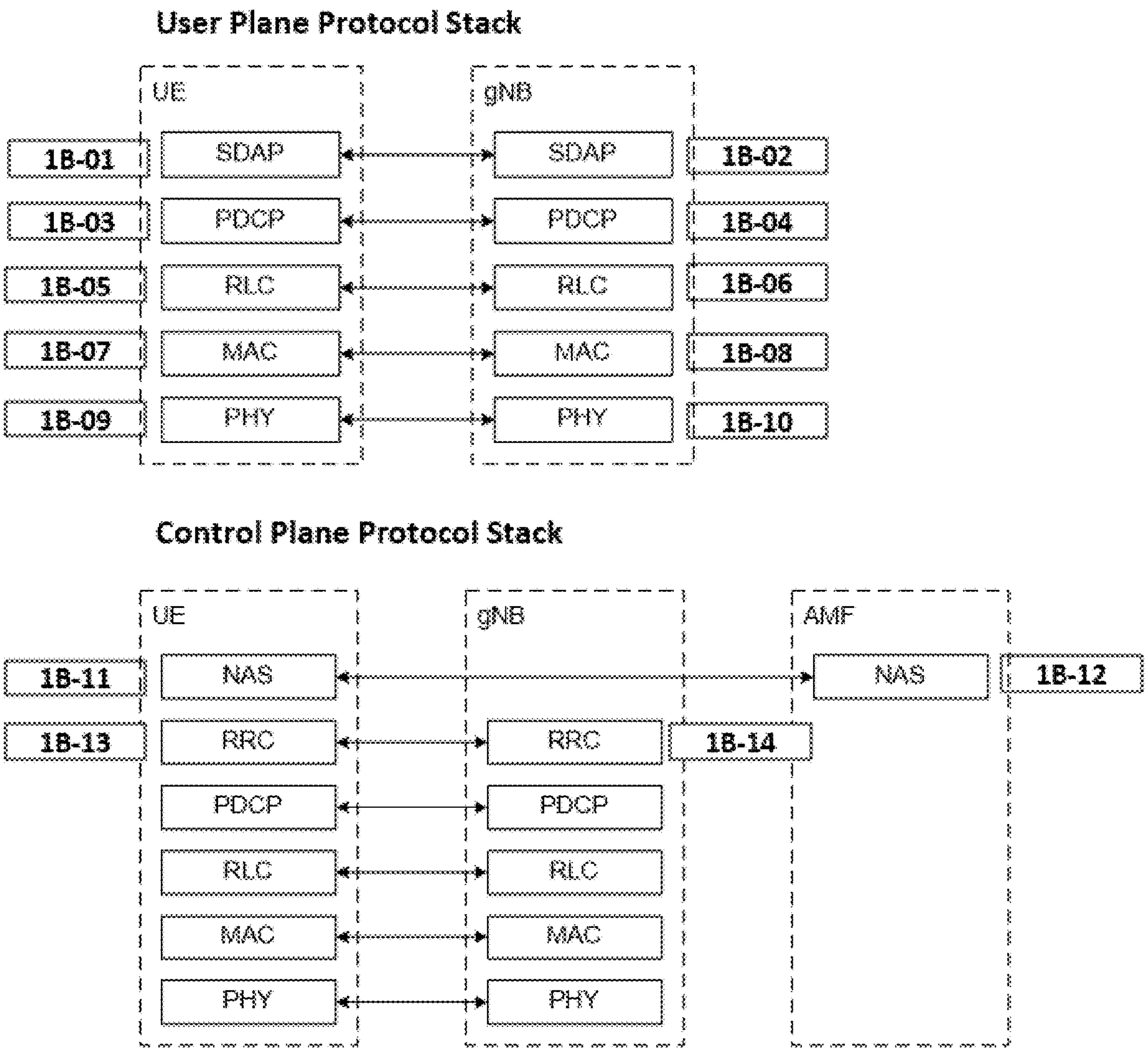
FIG. 1B is a diagram illustrating a wireless protocol architecture in an 5G system to which the disclosure may be applied.

FIG. 1B is a diagram illustrating a wireless protocol architecture in an 5G system.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed in the table 3.

TABLE 3

| Sublayer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

The terminal supports three RRC states. Table 4 lists the characteristics of each state.

TABLE 4

| RRC state | Characteristic |
|---|---|
| RRC_IDLE | PLMN selection; Broadcast of system information;<br>Cell re-selection mobility;<br>Paging for mobile terminated data is initiated by 5GC;<br>DRX for CN paging configured by NAS. |
| RRC_INACTIVE | PLMN selection; Broadcast of system information; Cell re-selection mobility;<br>Paging is initiated by NG-RAN (RAN paging);<br>RAN-based notification area (RNA) is managed by NG-RAN;<br>DRX for RAN paging configured by NG-RAN;<br>5GC - NG-RAN connection (both C/U-planes) is established for UE;<br>The UE AS context is stored in NG-RAN and the UE;<br>NG-RAN knows the RNA which the UE belongs to. |
| RRC_CONNECTED | 5GC - NG-RAN connection (both C/U-planes) is established for UE; The UE AS context is stored in NG-RAN and the UE; NG-RAN knows the cell which the UE belongs to;<br>Transfer of unicast data to/from the UE;<br>Network controlled mobility including measurements. |

Figure 1C:
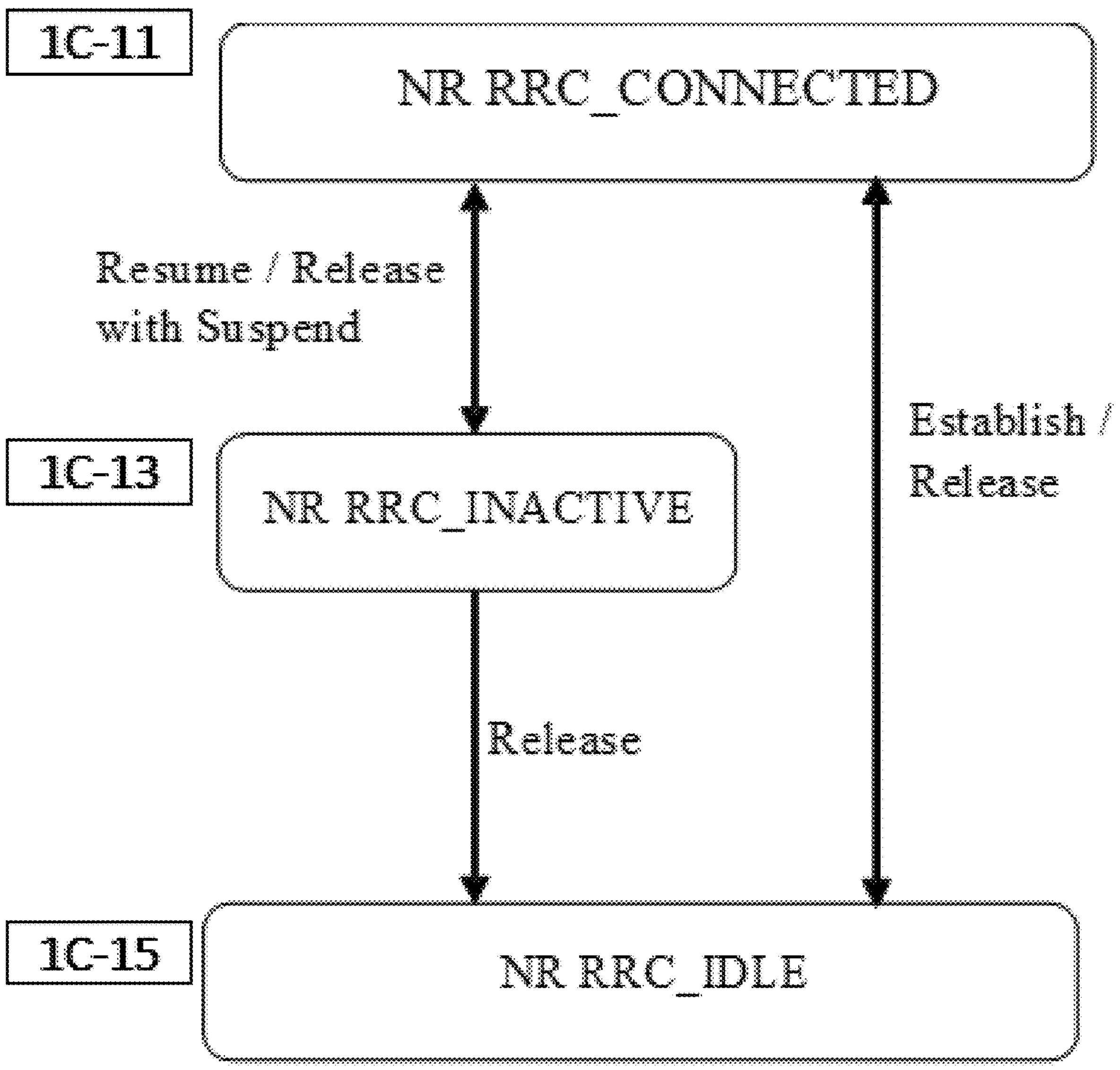
FIG. 1C is a diagram illustrating RRC state transition.

FIG. 1C is a diagram illustrating an RRC state transition.

Between RRC_CONNECTED 1C-11 and RRC_INACTIVE 1C-13, a state transition occurs due to the exchange of the Resume message and the Release message containing the Suspend IE.

A state transition occurs between RRC_CONNECTED 1C-11 and RRC_IDLE 1C-15 through RRC connection establishment and RRC connection release.

SuspendConfig IE includes the following information.

<SuspendConfig>

1. The first terminal identifier: an identifier of a terminal that may be included in the ResumeRequest when a state transition to RRC_CONNECTED is made. It has a 40-bit length.
2. The second terminal identifier: an identifier of a terminal that may be included in the Resume Request when a state transition to RRC_CONNECTED is made. It has a 24-bit length.
3. ran-Paging Cycle: Paging cycle to be applied in RRC_INACTIVE state.
4. ran-Notification AreaInfo: Configuration information of a ran-Notification Area consisting of a list of cells and the like. The terminal initiates a resume procedure when the ran_Notification Area is changed.
5. t380: Timer related to the periodic resumption procedure.
6. NextHopChangingCount (NCC): Counter used to derive new security keys after performing the resume procedure.
7. Extended-ran-Paging-Cycle: Paging cycle to be applied in RRC_INACTIVE when extended DRX is configured. It indicates one of predefined values: rf256, rf512, rf1024 and a reserved value.

Figure 1D:
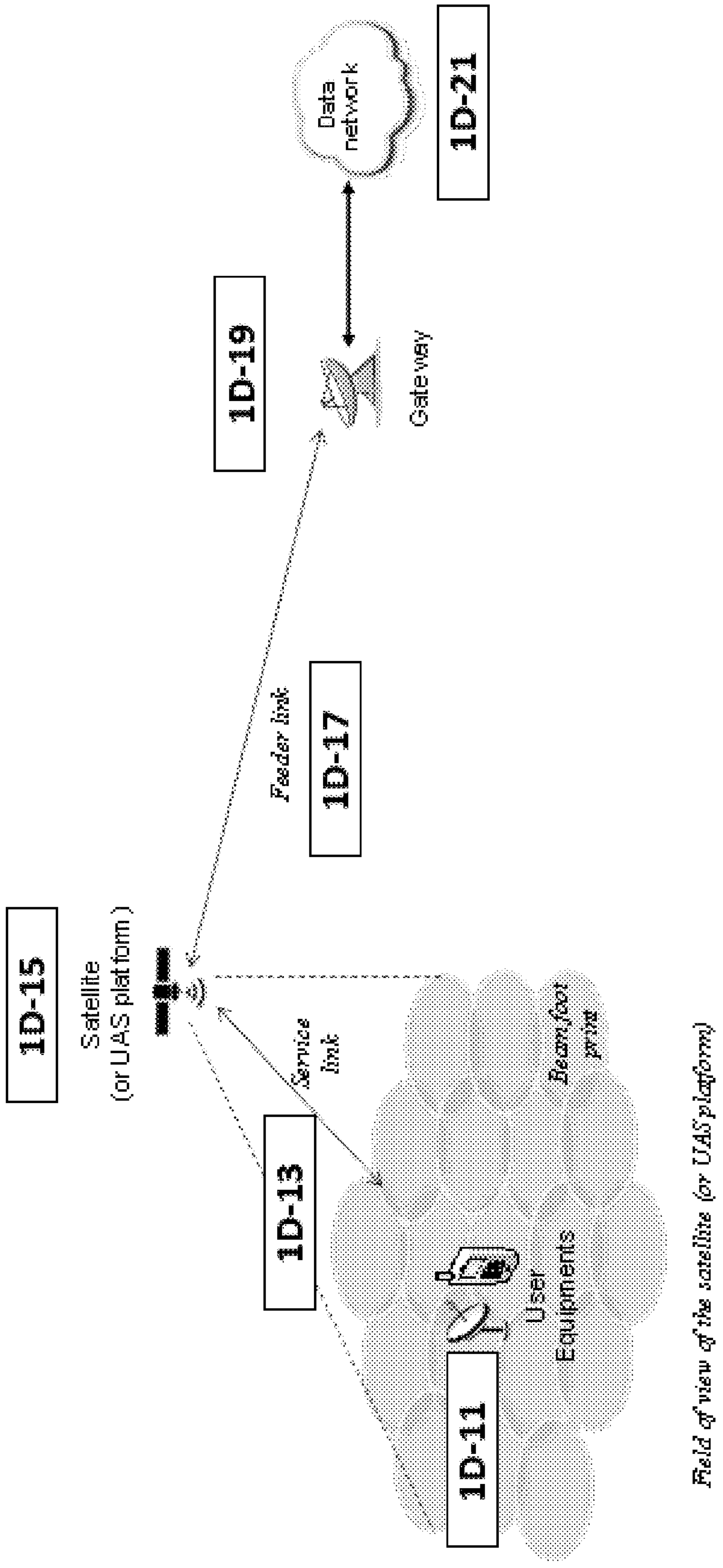
FIG. 1D is a diagram illustrating architecture of NTN

FIG. 1D is a diagram illustrating architecture of NTN.

A non-terrestrial network refers to a network, or segment of networks using RF resources on board a satellite (or UAS platform).

The typical scenario of a non-terrestrial network providing access to user equipment is depicted in FIG. 1D.

Non-Terrestrial Network typically consists of the following elements:

One or several sat-gateways 1D-19 that connect the Non-Terrestrial Network to a public data network 1D-21. A Feeder link 1D-17 or radio link between a sat-gateway and the satellite. A service link 1D-13 or radio link between the user equipment and the satellite. A satellite 1D-15 providing RF resource. User Equipment 1D-11 served by the satellite within the targeted service area.

Figure 1E:
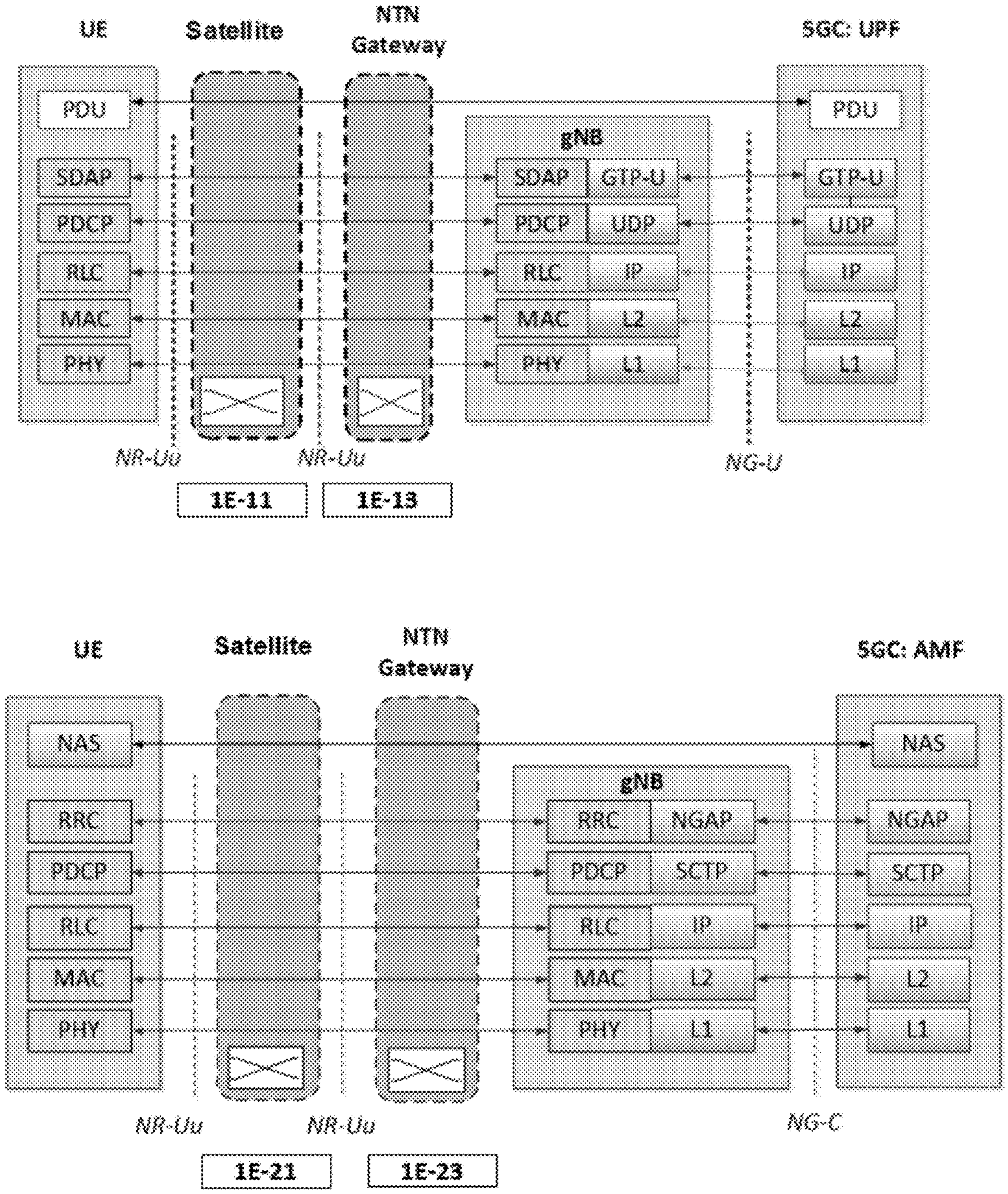
FIG. 1E is a diagram illustrating protocol architecture of NTN.

FIG. 1E is a diagram illustrating protocol architecture of NTN.

Satellite 1E-11 or 1E-21 and NTN gateway 1E-13 and 1E-23 are equipped with RF processing & Frequency Switching to relay the signal between gNB and UE. Other protocols such as SDAP, PDCP, RLC, MAC, PHY, RRC, NAS are same as used in normal terrestrial network.

Figure 1F:
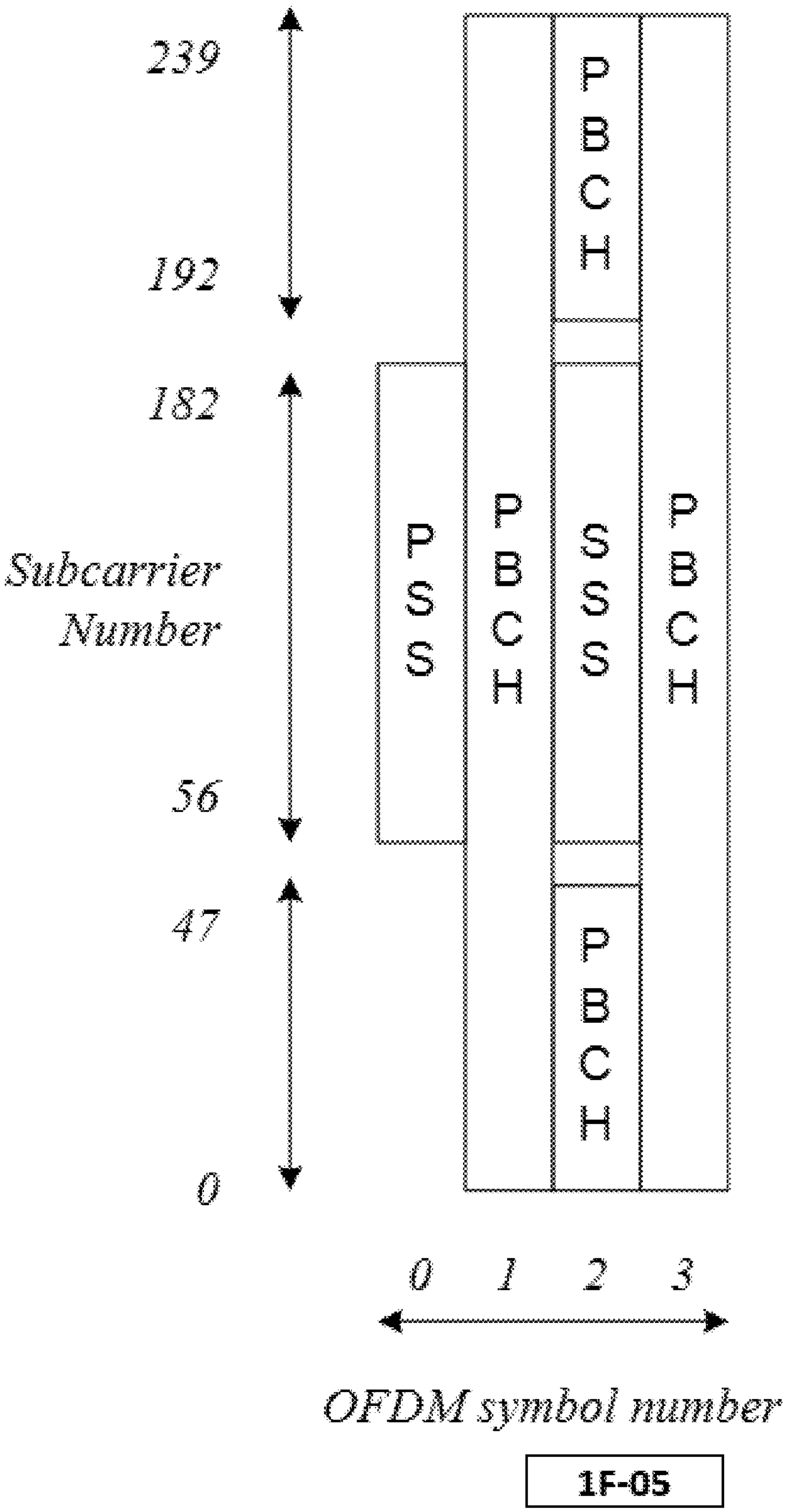
FIG. 1F is a diagram illustrating SS/PBCH.

FIG. 1F is a diagram illustrating SS/PBCH.

The Synchronization Signal and PBCH block (SSB) consists of primary and secondary synchronization signals (PSS, SSS), each occupying 1 symbol and 127 subcarriers, and PBCH spanning across 3 OFDM symbols 1F-05 and 240 subcarriers, but on one symbol leaving an unused part in the middle for SSS as show in FIG. 1F. The possible time locations of SSBs within a half-frame are determined by sub-carrier spacing and the periodicity of the half-frames where SSBs are transmitted is configured by the network. During a half-frame, different SSBs may be transmitted in different spatial directions (i.e. using different beams, spanning the coverage area of a cell).

The length of a half-frame is 5 ms. The periodicity of a half-frame is 5 ms or 10 ms or 20 ms or 40 ms or 80 ms or 160 ms. UE tries to measure SSBs during the half-frame. Base station can configure UE with SMTC for SSB measurement. SMTC can be configured in accordance with the half-frame.

In general, half-frames of cells in a same frequency are synchronized. Hence only one SMTC is required. However, in NTN, due to long propagation delay half-frames between neighbour cells can be received in different point of time depending on UE location. It requires plurality of SMTCs if UE needs to measure plurality of neighbor cells.

Figure 2A:
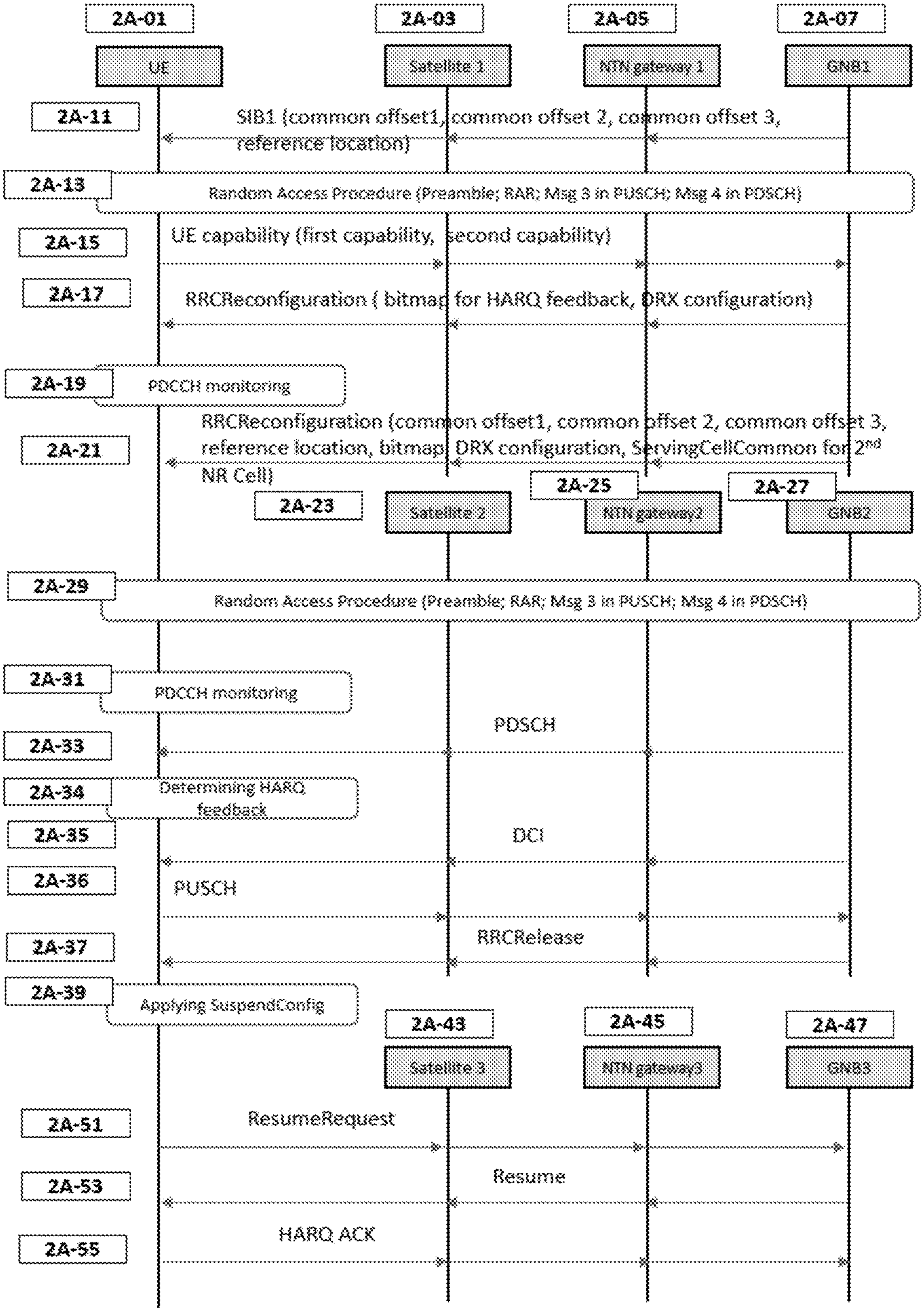
FIG. 2A is a diagram illustrating operations of a terminal and a base station according to an embodiment of the present invention.

FIG. 2A is a diagram illustrating the operation of UE and GNB according to the embodiment of the invention.

In 2A-11, GNB1 transmits, via NTN gateway2A-05 and Satellite 2A-03, SIB1 message. SIB1 contains information relevant when evaluating if a UE is allowed to access a cell and defines the scheduling of other system information. It also contains radio resource configuration information that is common for all UEs and barring information applied to the unified access control.

SIB1 includes ServingCellConfigCommonSIB IE, which is used to configure cell specific parameters of a UE's serving cell.

ServingCellConfigCommonSIB IE includes a common offset1 and a common offset2 and a common offset3 and a reference location and other IEs.

In 2A-13, UE and GNB1 performs random access procedure via NTN gateway1 and Satellite1. During the random access procedure, UE transmits and GNB receives preamble. GNB transmits and UE receives RAR. UE transmits and GNB receives Msg3. UE receives and GNB transmits Msg4.

UE starts ra-Response Window based on RTTslot which is determined from common offset2 and common offset3 and reference position and the number of slot per subframe.

UE starts ra-ContentionResolutionTimer based on RTTsubframe which is determined from common offset2 and common offset3 and reference position.

UE determines time slot for PUSCH transmission based on common offset1 and subcarrier spacing and the value indicated in PUSCH time resource allocation field.

common offset1 and common offset2 and reference position and subcarrier spacing are included in ServingCellConfigCommonSIB in SIB1 number of slots per subframe is determined from subcarrier spacing of DL BWP where RAR is monitored.

UE transmits a preamble and GNB receives the transmitted preamble. UE performs followings for preamble transmission.

UE selects an SSB with SS-RSRP above rsrp-ThresholdSSB. UE selects a Random Access Preamble group. UE selects a Random Access Preamble randomly with equal probability from the Random Access Preambles associated with the selected SSB and the selected Random Access Preambles group. UE determine the next available PRACH occasion from the PRACH occasions corresponding to the selected SSB.

UE transmits the selected Random Access Preamble at the determined PRACH occasion. UE applies subcarrier spacing indicated in msg1-SubcarrierSpacing which is included in SIB1.

UE receives RAR which includes an uplink grant. UE uses IEs such as RACH-ConfigCommon and PDCCH-ConfigCommon and PUSCH-ConfigCommon which are included in SIB1.

To receive RAR, UE start the ra-Response Window configured by RACH-ConfigCommon at the first PDCCH occasion from the end of the Random Access Preamble transmission plus RTTslot. UE monitors the PDCCH of the SpCell for Random Access Response(s) identified by the RA-RNTI while the ra-Response Window is running.

In monitoring PDCCH, UE applies searchSpace indicated by ra-SearchSpace in PDCCH-ConfigCommon.

UE consider Random Access Response reception is successful if the Random Access Response contains a MAC subPDU with Random Access Preamble identifier corresponding to the transmitted Random Access Preamble.

The MAC subPDU contains a MAC RAR. The MAC RAR includes fields like Timing Advance Command, Uplink Grant and Temporary C-RNTI. The Timing Advance Command field indicates the index value used to control the amount of timing adjustment that the UE has to apply. The size of the Timing Advance Command field is 12 bits. The Uplink Grant field indicates the resources to be used on the uplink. The size of the UL Grant field is 27 bits. The Temporary C-RNTI field indicates the temporary identity that is used by the UE during Random Access. The size of the Temporary C-RNTI field is 16 bits Uplink Grant field further includes PUSCH time resource allocation field. PUSCH time resource allocation field is 4 bit.

This field indicates a TimeDomainResourceAllocation of a TimeDomainResourceAllocationList in PUSCH-ConfigCommon.

This field indicates an indexed row of a default PUSCH time domain resource allocation table illustrated in table x if PUSCH-ConfigCommon does not include TimeDomainResourceAllocationList.

TABLE 5

| Row index | $K_2$ | S | L |
|---|---|---|---|
| 1 | j | 0 | 14 |
| 2 | j | 0 | 12 |
| 3 | j | 0 | 10 |
| 4 | j | 2 | 10 |
| 5 | j | 4 | 10 |
| 6 | j | 4 | 8 |
| 7 | j | 4 | 6 |
| 8 | j + 1 | 0 | 14 |
| 9 | j + 1 | 0 | 12 |
| 10 | j + 1 | 0 | 10 |
| 11 | j + 2 | 0 | 14 |
| 12 | j + 2 | 0 | 12 |
| 13 | j + 2 | 0 | 10 |
| 14 | j | 8 | 6 |
| 15 | j + 3 | 0 | 14 |
| 16 | j + 3 | 0 | 10 |

j is a value specific to the PUSCH subcarrier spacing and is defined in the table below.

TABLE 6

| PUSCH subcarrier Spacing | j |
|---|---|
| 15 kHz | 1 |
| 30 kHz | 1 |
| 60 kHz | 2 |
| 120 kHz | 3 |

When the UE transmits a PUSCH scheduled by RAR, the delta value specific to the PUSCH subcarrier spacing is applied in addition to the K2 value.

TABLE 7

| PUSCH subcarrier Spacing | delta |
|---|---|
| 15 kHz | 2 |
| 30 KHz | 3 |
| 60 kHz | 4 |
| 120 KHz | 6 |

UE determines K2 based on h, the value indicated in PUSCH time resource allocation field.

If PUSCH-ConfigCommon includes TimeDomainResource AllocationList, h indicates (h+1)th entry of TimeDomainResource AllocationList. Each entry of TimeDomainResource AllocationList (or each TimeDomainResource Allocation of TimeDomainResource AllocationList) is associated with a k2. UE determines k2 for the PUSCH transmission by the k2 value associated with the TimeDomainResource Allocation which is indicated by h.

If PUSCH-ConfigCommon does not includes

TimeDomainResource AllocationList, h indicates row index (h+1) of the default PUSCH time domain resource allocation table. Each row of the default PUSCH time domain resource allocation table is associated with k2 which is a function of j. and i. UE determines j according to the PUSCH subcarrier spacing. UE determines i based on h. UE determines k2 by adding the determined j and determined i. In other words, UE determines k2 based on the j determined based on the PUSCH subcarrier spacing and the row index determined based on the h.

PUSCH subcarrier spacing is determined by a subcarrier spacing IE included in BWP-UplinkCommon IE.

UE determines the time slot for PUSCH transmission scheduled by RAR. If a UE receives a PDSCH with a RAR message ending in slot n for a corresponding PRACH transmission from the UE, the UE transmits the PUSCH in slot (n+k2+delta+x common offset1). k2 and delta and x are subcarrier spacing specific and determined as below.

If TimeDomainResourceAllocationList is not included in PUSCH-ConfigCommon in ServingCellConfigCommonSIB, k2 is determined based on h and j and i. j is determined based on subcarrier spacing IE included in BWP-UplinkCommon IE in ServingCellConfigCommonSIB. If subcarrier spacing IE indicates 15 kHz or 30 kHz, j is 1. If subcarrier spacing IE indicates 60 kHz, j is 2. If subcarrier spacing IE indicates 120 kHz, j is 3.

Delta is determined based on subcarrier spacing IE included in BWP-UplinkCommon IE in ServingCellConfigCommonSIB. If subcarrier spacing IE indicates 15 kHz, delta is 2. If subcarrier spacing IE indicates 30 kHz, delta is 3. If subcarrier spacing IE indicates 60 kHz, delta is 4. If subcarrier spacing IE indicates 120 kHz, delta is 6.

x is determined based on subcarrier spacing IE included in BWP-UplinkCommon IE in ServingCellConfigCommonSIB. If subcarrier spacing IE indicates 15 kHz, x is 1. If subcarrier spacing IE indicates 30 kHz, x is 2. If subcarrier spacing IE indicates 60 kHz, x is 4. If subcarrier spacing IE indicates 120 kHz, x is 8.

common offset1 is indicated in ServingCellConfigCommonSIB in SIB1.

UE generates Msg3. Msg3 contains CCCH SDU such as RRCSetupRequest.

UE transmits Msg3 at the determined slot. Once Msg3 is transmitted, UE starts ra-ContentionResolutionTimer in the first symbol after the end of the Msg3 transmission plus RTTsubframe.

UE monitors the PDCCH while the ra-ContentionResolutionTimer is running.

If PDCCH is received and the PDCCH transmission is addressed to temporary C-RNTI and if the MAC PDU is successfully decoded, UE stop ra-ContentionResolutionTimer.

UE generates acknowledgement of the data in the TB (or in the MAC PDU).

If the MAC PDU contains a UE Contention Resolution Identity MAC CE and the UE Contention Resolution Identity MAC CE matches the CCCH SDU transmitted in Msg3, UE consider this Contention Resolution successful and consider this Random Access procedure successfully completed.

If the MAC PDU contains RRCSetup message, UE establish RRC connection with the GNB1 and enters into RRC_CONNECTED state.

In 2A-15, UE reports its capability to GNB1. For NTN related capability, UE transmits a plurality of per UE capability IEs and a plurality of per Band capability IEs.

NTN related per UE capability includes a IE indicating whether UE support disabling HARQ feedback.

NTN related per Band capability IE is a IE including a band indicator IE and a plurality of subIEs indicating supported features in the band. the band indicator IE indicates that the band is NTN related band.

If UE reports support of at least one NTN specific band, UE also support, without explicit signaling, adapting HARQ RTT timer for DRX and delaying ra-ContentionResolutionTimer and delaying ra-Response Window and determining PUSCH transmission slot based on common offset1.

Based on the reported UE capability, GNB1 determines the configurations to be applied to the UE.

In 2A-17, GNB1 transmits RRCReconfiguration to UE. RRCReconfiguration message may include DRX configuration and DL HARQ feedback bitmap. DRX configuration is per MAC entity and DL HARQ feedback bitmap is per serving cell. A single DRX configuration IE and plurality of DL HARQ feedback bitmaps may be included in the RRCReconfiguration message.

the DL HARQ feedback bitmap is 32 bit long and each bit of the bitmap indicate whether DL HARQ feedback is disabled per HARQ process ID. In NTN, due to long propagation delay, HARQ operation based on feedback could be inefficient for such traffic like TCP. GNB can disable HARQ feedback for some HARQ processes to handle such traffic.

UE may be configured with DRX functionality that controls the UE's PDCCH monitoring activity. When DRX is configured, the UE does not have to continuously monitor PDCCH. DRX is characterized by the following:

- on-duration: duration that the UE waits for, after waking up, to receive PDCCHs. If the UE successfully decodes a PDCCH, the UE stays awake and starts the inactivity timer;
- inactivity-timer: duration that the UE waits to successfully decode a PDCCH. The UE shall restart the inactivity timer following a single successful decoding of a PDCCH for a first transmission;
- retransmission-timer: duration until a retransmission can be expected;
- DRX-cycle: specifies the periodic repetition of the on-duration followed by a possible period of inactivity;
- active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.
- drx-HARQ-RTT-TimerDL (per DL HARQ process except for the broadcast process): the minimum duration before a DL assignment for HARQ retransmission is expected DRX configuration IE includes following subIEs. drx-onDurationTimer, drx-InactivityTimer, drx-HARQ-RTT-TimerDL, drx-RetransmissionTimerDL etc.

Above subIEs specify the initial values of the corresponding timers.

In 2A-19, UE monitors PDCCH according to the DRX operation. GNB schedules UE during its active-time.

If the PDCCH indicates a DL transmission and if this Serving Cell is configured with downlinkHARQ-FeedbackDisabled (e.g. DL HARQ feedback bitmap is configured for this serving cell) and DL HARQ feedback is enabled for the corresponding HARQ process, UE sets drx-HARQ-RTT-TimerDL length for the corresponding HARQ process to drx-HARQ-RTT-TimerDL included in the DRX configuration plus RTTsymbol.

If the PDCCH indicates a DL transmission and if this Serving Cell is not configured with downlinkHARQ-FeedbackDisabled, UE sets drx-HARQ-RTT-TimerDL length for the corresponding HARQ process to drx-HARQ-RTT-TimerDL included in the DRX configuration.

Upon expiry of drx-HARQ-RTT-TimerDL, if the data of the corresponding HARQ process was not successfully decoded, UE starts the drx-Retransmission TimerDL for the corresponding HARQ process in the first symbol after the expiry of drx-HARQ-RTT-TimerDL.

If the PDCCH indicates a new transmission (DL or UL), UE starts or restart drx-InactivityTimer in the first symbol after the end of the PDCCH reception.

GNB1 may decide to handover UE to another cell of another GNB based on UE channel condition or load condition.

In 2A-21, GNB1 transmits UE a RRCReconfiguration message for handover toward NR Cell2 of GNB2.

The RRCReconfiguration message includes a SpCellConfig 1E for the target SpCell. SpCellConfig 1E includes a ServingCellConfigCommon IE. The ServingCellConfigCommon IE includes a common offset1 and a common offset2 and a common offset3 and a reference location.

The RRCReconfiguration message includes a DRX configuration IE and a plurality of HARQ feedback bitmaps.

UE starts synchronising to the DL of the target SpCell. UE applies the specified BCCH configuration for the target SpCell and acquire the MIB of the target SpCell.

In 2A-29, UE performs random access procedure with GNB2 via NTN gateway2(2A-25) and Satellite2(2A-23).

UE transmits a preamble based on the information received in RRCReconfiguration message and GNB receives the transmitted preamble.

UE starts ra-Response Window based on RTTslot which is determined from common offset2 and common offset3 and reference position and the number of slot per subframe.

UE starts ra-ContentionResolutionTimer based on RTTsubframe which is determined from common offset2 and common offset3 and reference position.

UE determines time slot for PUSCH transmission based on common offset1 and subcarrier spacing and the value indicated in PUSCH time resource allocation field.

common offset1 and common offset2 and reference position and subcarrier spacing are included in ServingCellConfigCommon in RRCReconfiguration message received in the first NR Cell.

UE start the ra-Response Window configured by RACH-ConfigCommon at the first PDCCH occasion from the end of the Random Access Preamble transmission plus RTTslot. RTTslot is determined based on the information received in RRCReconfiguration message.

UE receives Random Access Response.

UE determines the time slot for PUSCH transmission scheduled by RAR. If a UE receives a PDSCH with a RAR message ending in slot n for a corresponding PRACH transmission from the UE, the UE transmits the PUSCH in slot (n+k2+delta+x common offset1). k2 and delta and x are subcarrier spacing specific and determined as below.

If TimeDomainResourceAllocationList is not included in PUSCH-ConfigCommon in ServingCellConfigCommon, k2 and delta are determined based on h and j and i.

j and delta and x are determined based on subcarrier spacing IE included in BWP-UplinkCommon IE in ServingCellConfigCommon in SpCellConfig in RRCReconfiguration.

If subcarrier spacing IE indicates 15 kHz or 30 kHz, j is 1. If subcarrier spacing IE indicates 60 kHz, j is 2. If subcarrier spacing IE indicates 120 kHz, j is 3.

If subcarrier spacing IE indicates 15 kHz, delta is 2. If subcarrier spacing IE indicates 30 kHz, delta is 3. If subcarrier spacing IE indicates 60 kHz, delta is 4. If subcarrier spacing IE indicates 120 kHz, delta is 6.

If subcarrier spacing IE indicates 15 kHz, x is 1. If subcarrier spacing IE indicates 30 kHz, x is 2. If subcarrier spacing IE indicates 60 kHz, x is 4. If subcarrier spacing IE indicates 120 kHz, x is 8.

common offset1 is indicated in ServingCellConfigCommon in SpCellConfig in RRCReconfiguration.

UE transmits Msg3 and starts ra-ContentionResolutionTimer based on RTTsubframe. RTTsubframe is determined based on the information received in RRCReconfiguration message.

If PDCCH is received and the PDCCH transmission is addressed to the C-RNTI and contains a UL grant for a new transmission, UE stop ra-ContentionResolutionTimer.

when UE acquires SFN of the second NR cell, UE starts DRX operation in PDCCH monitoring in the second cell.

In 2A-31, UE monitors PDCCH according to the DRX configuration. GNB2 schedules UE during its active-time.

If the PDCCH indicates a DL transmission and if this Serving Cell is configured with downlinkHARQ-FeedbackDisabled and DL HARQ feedback is enabled for the corresponding HARQ process, UE sets drx-HARQ-RTT-TimerDL length for the corresponding HARQ process to drx-HARQ-RTT-TimerDL included in the DRX configuration plus RTTsymbol.

If the PDCCH indicates a DL transmission and if this Serving Cell is not configured with downlinkHARQ-FeedbackDisabled, UE sets drx-HARQ-RTT-TimerDL length for the corresponding HARQ process to drx-HARQ-RTT-TimerDL included in the DRX configuration.

Upon expiry of drx-HARQ-RTT-TimerDL, if the data of the corresponding HARQ process was not successfully decoded, UE starts the drx-RetransmissionTimerDL for the corresponding HARQ process in the first symbol after the expiry of drx-HARQ-RTT-TimerDL.

If the PDCCH indicates a new transmission (DL or UL), UE starts or restart drx-Inactivity Timer in the first symbol after the end of the PDCCH reception.

The DRX configuration is included in the RRCReconfiguration message received in the first NR cell.

In 2A-33, UE allocates the TB(s) received from the physical layer and the associated HARQ information to the HARQ process indicated by the associated HARQ information if a downlink assignment has been indicated. UE attempt to decode the received data in the HARQ process. In the disclosure, TB and MAC PDU are used interchangeably.

In 2A-34, UE determines whether to transmit HARQ feedback for the data in the TB or not.

If the HARQ process is configured with disabled HARQ feedback based on the bitmap in the RRCReconfiguration message received in the first NR cell, UE does not generate acknowledgement of the data in the TB. If the HARQ process is configured with enabled HARQ feedback based on the bitmap in the RRCReconfiguration message received in the first NR cell, UE generates acknowledgement of the data in the TB and transmit the acknowledgement to GNB2 in the second NR cell.

In 2A-35, UE receives a DCI scheduling PUSCH in the second NR cell.

If PUSCH transmission is scheduled by DCI, UE determines the time slot for PUSCH transmission based on common offset1. If a UE receives a PDCCH in slot n, the UE transmits the PUSCH in slot (n+k2+x*common offset1).

x is determined based on subcarrier spacing IE included in BWP-UplinkCommon IE in RRCReconfiguration message. If subcarrier spacing IE indicates 15 kHz, x is 1. If subcarrier spacing IE indicates 30 kHz, x is 2. If subcarrier spacing IE indicates 60 kHz, x is 4. If subcarrier spacing IE indicates 120 kHz, x is 8.

k2 is determined based on the value h indicated in Time domain resource assignment field in the DCI. h indicates (h+1)th entry of TimeDomainResource AllocationList in RRCReconfiguration message. Each entry of TimeDomainResource AllocationList (or each TimeDomainResource Allocation of TimeDomainResource AllocationList) is associated with a k2. UE determines k2 for the PUSCH transmission by the k2 value associated with the TimeDomainResource Allocation which is indicated by h.

In 2A-36, UE transmits PUSCH at the determined slot.

GNB2 may decide to suspend RRC connection if data activity stops for the UE.

In 2A-37, GNB2 transmits RRCRelease message to UE. The RRCRelease message includes SuspendConfig.

In 2A-39, UE performs the necessary actions based on the information included in the RRCRelease message. The necessary actions include followings.

UE applies the received suspendConfig. UE resets MAC and releases the default MAC Cell Group configuration. UE re-establish RLC entities for SRB1. UE stores in the UE Inactive AS Context the current security keys, the C-RNTI used in the source PCell, the cellIdentity and the physical cell identity of the source PCell, the spCellConfigCommon within Reconfiguration WithSync of the NR PSCell. UE suspends all SRB(s) and DRB(s), except SRB0. UE enters RRC_INACTIVE and perform cell selection.

UE delays the necessary actions release_delay ms from the moment the RRCRelease message was received or optionally when lower layers indicate that the receipt of the RRCRelease message has been successfully acknowledged, whichever is earlier. release_delay is sum of 60 and common offset2 and TLTA. The reason is to provide the sufficient time for UE to send layer 2 acknowledgement to the RRCRelease message.

During RRC_INACTIVE state, UE monitors paging channels. When UL data arrives to the UE, UE initiates RRC connection resumption procedure in the current cell.

In 2A-51 UE performs random access procedure in the third NR cell via GNB3 (2A-47) and satellite 3 (2A-43) and NTN gateway3(2A-45). During the random access procedure, UE transmits ResumeRequest message in Msg3 and starts ra-ContentionResolutionTimer in the first symbol after the end of the Msg3 transmission plus RTTsubframe. UE determines RTTsubframe based on the information in the SIB1 received in the third NR cell.

GNB3 receives the Msg3 and generates RRCResume message.

In 2A-53, GNB3 transmits RRCResume message with a UE Contention Resolution Identity MAC CE in a MAC PDU/TB. Even if the HARQ feedback of the HARQ process is indicated as disabled in the DL HARQ feedback bitmap in the RRCReconfiguration message received in the second NR cell, UE generates acknowledgement of the data in the TB.

In 2A-55, UE transmits HARQ feedback for the data in the TB.

UE and GNB3 continue the data communication after RRC connection resumption.

ServingCellConfigCommonSIB IE in SIB1 includes a common offset1 and a common offset2 and a common offset3 and a reference location and other IEs. The common offset1 and the common offset2 and the common offset3 and the reference location are used in the cell where the SIB1 is broadcast.

ServingCellConfigCommonSIB IE in SIB1 includes downlinkConfigCommon IE and uplinkConfigCommon IE. downlinkConfigCommon IE provides common downlink parameters of a cell. uplinkConfigCommon IE provides common uplink parameters of a cell. downlinkConfigCommon IE includes BWP-DownlinkCommon IE, used to configure the common parameters of a donwlink BWP, for initial downlink BWP. uplinkConfigCommon IE includes BWP-UplinkCommon IE, used to configure the common parameters of a uplink BWP, for initial uplink BWP.

ServingCellConfigCommon IE in RRCReconfiguration includes a common offset1 and a common offset2 and a common offset3 and a reference location and other IEs. The common offset1 and the common offset2 are used in the target SpCell indicated by RRCReconfiguration message received. The common offset3 and the reference location are used in the cell where the RRCReconfiguration message is received or in the target SpCell indicated by RRCReconfiguration message. If the RRCReconfiguration message does not include ReconfigWithSync for MCG(I.E., the RRCReconfiguration message is not related with handover), the common offset3 and the reference location are used in the cell where the RRCReconfiguration message is received. If the RRCReconfiguration message includes ReconfigWithSync for MCG (I.E., the RRCReconfiguration message is related with handover), the common offset3 and the reference location are used in the target SpCell.

ServingCellConfigCommon IE in RRCReconfiguration includes downlinkConfigCommon IE which provides common downlink parameters of a cell and uplinkConfigCommon IE which provides common uplink parameters of a cell. downlinkConfigCommon IE includes BWP-DownlinkCommon IE, used to configure the common parameters of a donwlink BWP. uplinkConfigCommon IE includes BWP-UplinkCommon IE, used to configure the common parameters of a uplink BWP.

BWP-DownlinkCommon IE includes PDCCH-ConfigCommon IE and PDSCH-ConfigCommon IE and subcarrier spacing IE.

PDCCH-ConfigCommon IE is used to configure cell specific PDCCH parameters. PDSCH-ConfigCommon IE is used to configure cell specific PDSCH parameters. subcarrier spacing IE is Subcarrier spacing to be used in this BWP for all channels and reference signals unless explicitly configured.

BWP-UplinkCommon IE includes RACH-ConfigCommon IE and PUSCH-ConfigCommon IE and PUCCH-ConfigCommon IE and subcarrier spacing IE.

RACH-ConfigCommon IE is used to specify cell specific random-access parameters. PUSCH-ConfigCommon IE is used to configure cell specific PUSCH parameters. PUCCH-ConfigCommon IE is used to configure cell specific PUCCH parameters. subcarrier spacing IE is Subcarrier spacing to be used in this BWP for all channels and reference signals unless explicitly configured.

RACH-ConfigCommon is used to specify the cell specific random-access parameters and includes following IEs.

prach-ConfigurationIndex: An index indicating preamble format, SFN, subframe number, starting symbol, PRACH duration for PRACH preamble. It defines the time pattern of PRACH occasions and a preamble format which can be transmitted in the PRACH occasions.

msg1-FDM: The number of PRACH transmission occasions FDMed in one time instance.

msg1-FrequencyStart: Offset of lowest PRACH transmission occasion in frequency domain with respective to PRB 0.

preambleReceivedTargetPower: The target power level at the network receiver side. It is used to calculate preamble transmission power.

ra-Response Window: Msg2 (RAR) window length in number of slots.

messagePowerOffsetGroupB: Threshold for preamble selection.

numberOfRA-PreamblesGroupA: The number of CB preambles per SSB in group A.

ra-ContentionResolutionTimer: The initial value for the contention resolution timer.

ra-Msg3SizeGroupA: Transport Blocks size threshold in bits below which the UE shall use a contention-based RA preamble of group A.

rsrp-ThresholdSSB: UE may select the SS block and corresponding PRACH resource for path-loss estimation and (re)transmission based on SS blocks that satisfy the threshold.

rsrp-ThresholdSSB-SUL: The UE selects SUL carrier to perform random access based on this threshold.

totalNumberOfRA-Preambles: Total number of preambles used for contention based and contention free 4-step or 2-step random access in the RACH resources defined in RACH-ConfigCommon, excluding preambles used for other purposes (e.g. for SI request).

msg1-SubcarrierSpacing: Subcarrier spacing of PRACH

PUSCH-ConfigCommon is used to configure the cell specific PUSCH parameters and includes following IEs.

msg3-DeltaPreamble: Power offset between msg3 and RACH preamble transmission.

pusch-TimeDomainResourceAllocationList: List of time domain allocations for timing of UL assignment to UL data. This list is used for Mode 1.

pusch-TimeDomainResource AllocationList2: List of time domain allocations for timing of UL assignment to UL data. This list is used for Mode 2.

PUSCH-TimeDomainResourceAllocation is used to configure a time domain relation between PDCCH and PUSCH. PUSCH-TimeDomainResourceAllocationList contains one or more of such PUSCH-TimeDomainResourceAllocations. The network indicates in the UL grant which of the configured time domain allocations the UE shall apply for that UL grant. A PUSCH-TimeDomainResourceAllocation is associated with a k2 and startSymbolAndLength. k2 is the distance between PDCCH and PUSCH. startSymbolAndLength is an index giving valid combinations of start symbol and length.

PDCCH-ConfigCommon is used to configure cell specific PDCCH parameters includes following IEs.

commonControlResourceSet: An additional common control resource set which may be configured and used for any common or UE-specific search space.

commonSearchSpaceList: A list of additional common search spaces. If the network configures this field, it uses the SearchSpaceIds other than 0.

controlResourceSetZero: Parameters of the common CORESET #0 which can be used in any common or UE-specific search spaces.

pagingSearchSpace: ID of the Search space for paging.

ra-SearchSpace: ID of the Search space for random access procedure.

searchSpaceOtherSystemInformation: ID of the Search space for other system information, i.e., SIB2 and beyond.

searchSpaceZero: Parameters of the common SearchSpace #0.

RTTsymbol is derived from common offset2 and TLTA (Time Length of Timing Advance) and the number of symbols per subframe. TLTA is the sum of common offset3 and UE estimated offset. The UE estimated offset is the timing advance to be applied to mitigate the propagation delay between the satellite and the UE, It is derived from UE location acquired from UE GNSS system and the reference position provided in SIB1.

The unit of common offset3 and the unit of common offset2 and the unit of UE estimated offset are all ms. RTTsymbol is determined based on the common offset2 and TLTA and the number of symbols per subframe in the BWP where the transport block was received, If SCS of the BWP is 15 kHz, the number of symbols per ms is 14 and RTTsymbol is equal to 14*(common offset2+TLTA). If SCS of the BWP is 30 kHz, the number of symbols per ms is 2*14 and RTTsymbols is equal to 2*14*(common offset2+TLTA). Number of symbols per subframe is determined from subcarrier spacing of DL BWP where TB is received. Number of slot per subframe is determined from subcarrier spacing of DL BWP where RAR is monitored.

RTTslot is derived from common offset2 and TLTA (Time Length of Timing Advance) and the number of slots per subframe in the BWP where RAR is to be received. If SCS of the BWP is 15 kHz, the number of symbols per subframe is 1 and RTTsymbol is equal to the sum of common offset2 and TLTA. If SCS of the BWP is 30 kHz, the number of symbols per subframe is 2 and RTTsymbols is equal to 2*(common offset2+TLTA).

RTTsubframe is sum of common offset2 and TLTA.

common offset1 is related to a round trip time between UE and gNB gateway (or reference point). common offset2 is related to a propagation delay between gNB gateway and GNB. common offset1 and common offset2 are used to derive offset for DRX operation or scheduling operation, which are performed in ms level. The unit of the common offset1 and the common offset2 are ms.

common offset3 is related to a round trip time between satellite and gNB gateway. common offset3 is used to derive offset for uplink transmission timing adjustment, which is performed in basic time duration of NR. The unit of the common offset3 is basic time duration in NR which is 1/(480*10e3*4096) ms.

Figure 3A:
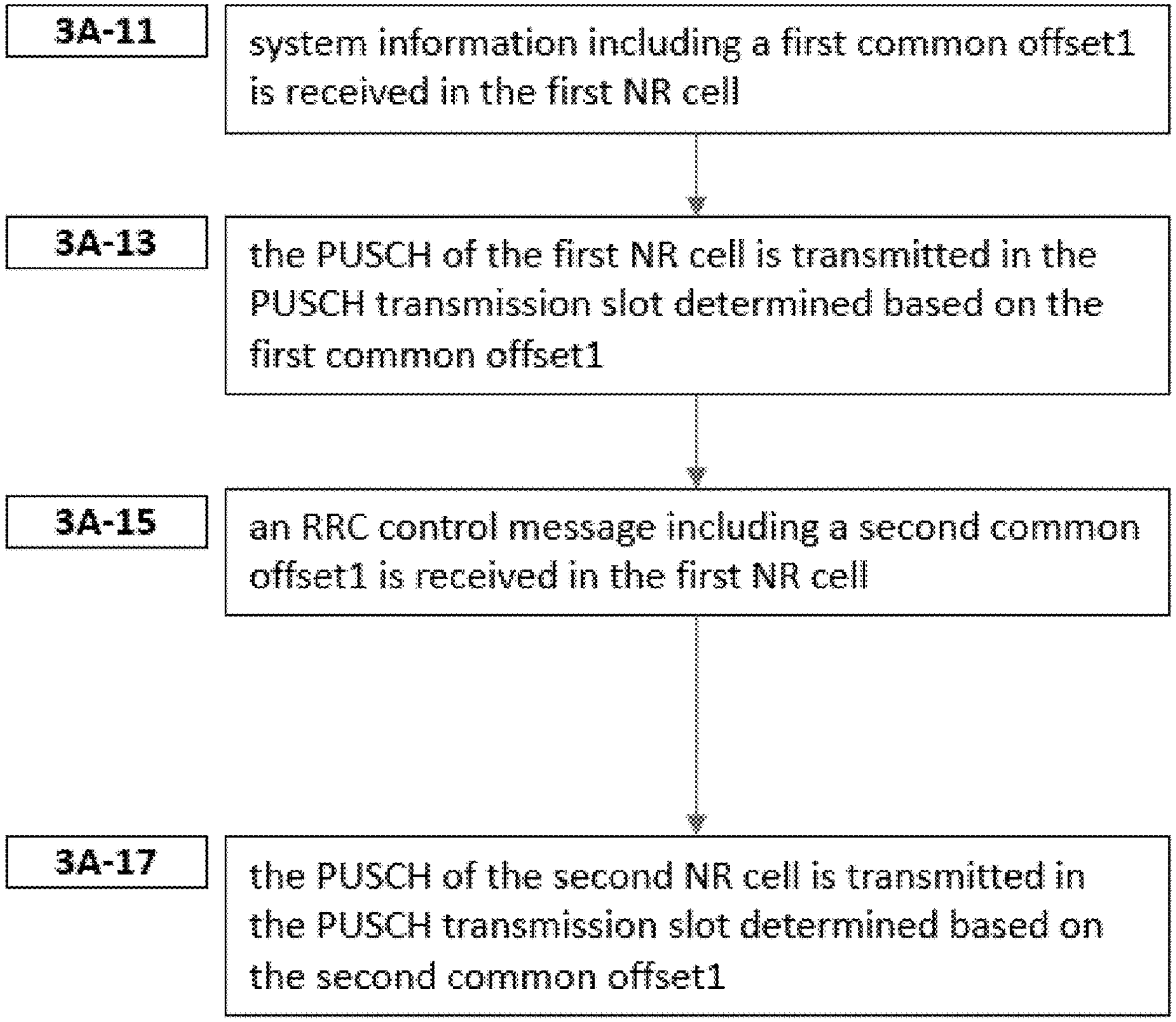
FIG. 3A is a flow diagram illustrating an operation of a terminal.

FIG. 3A illustrates the operation of the terminal.

In 3A-11, system information including a first common offset1 is received in the first NR cell.

In 3A-13, the PUSCH of the first NR cell is transmitted in the PUSCH transmission slot determined based on the first common offset1.

In 3A-15, an RRC control message including a second common offset1 is received in the first NR cell.

In 3A-17, the PUSCH of the second NR cell is transmitted in the PUSCH transmission slot determined based on the second common offset1.

The system information is SystemInformationBlock1 including ServingCellConfigCommonSIB for the first NR cell. The RRC control message is RRCReconfiguration including ServingCellConfigCommon for the second NR cell.

PUSCH transmission slot of the first NR cell is determined based on the first common offset1 and the integer d and the integer j and the integer i and the integer m. The integer d and the integer j and the integer m are determined by the subcarrier spacing of the uplink bandwidth part of the first NR cell. The integer i is determined by the random access response message received from the first NR cell. The subcarrier spacing of the uplink bandwidth part and the first common offset1 are included in the ServingCellConfigCommonSIB received from the first NR cell.

PUSCH transmission slot of the second NR cell is determined based on the second common offset1 and the integer k and the second integer m. The second integer m is determined by the subcarrier spacing of the uplink bandwidth part of the second NR cell. The integer k is determined by the downlink control information received from the second NR cell. The subcarrier interval of the uplink bandwidth part and the second common offset are included in the RRC control message received in the first NR cell.

A plurality of second capability information are reported by the terminal to the base station. Each of the second capability information among the plurality of second capability information indicates that the terminal supports NTN in a specific frequency band. If the terminal supports at least one NTN specific band, the terminal also supports common offset1 based PUSCH transmission slot determination.

Figure 4A:
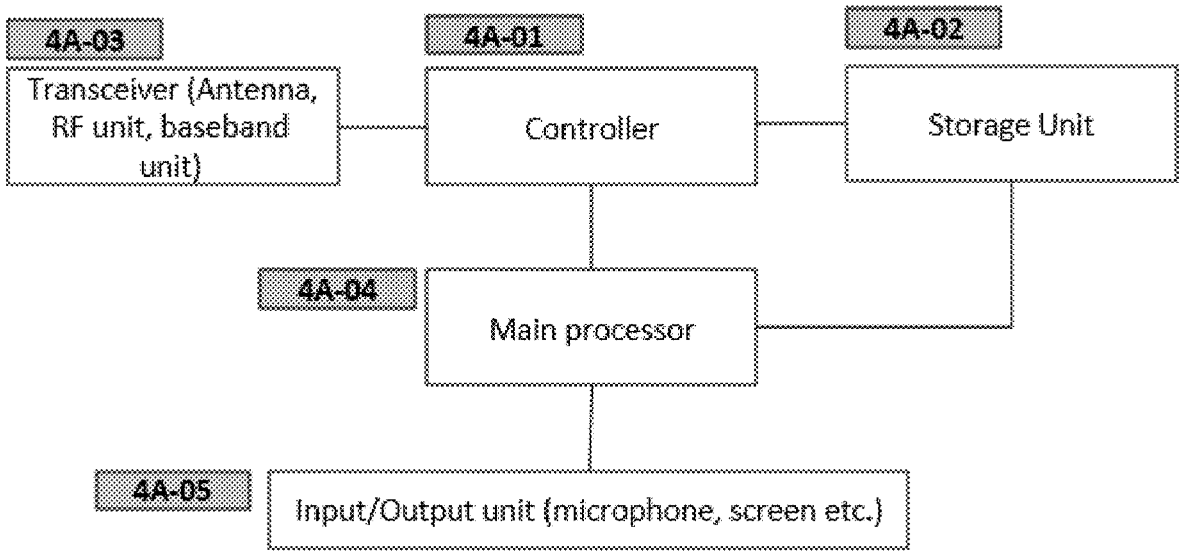
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2A and FIG. 3A are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
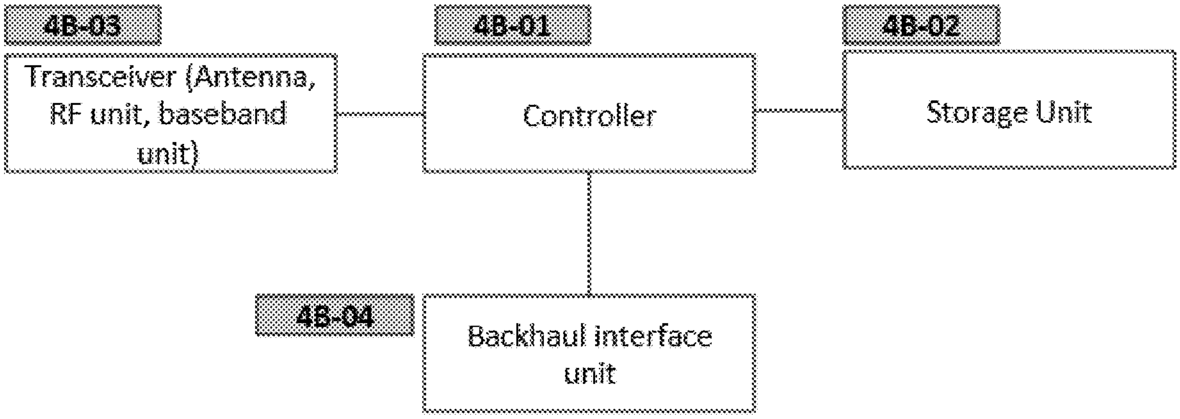
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2A are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi 10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

The invention claimed is:

1. A method by a terminal, the method comprising:

receiving, by the terminal, system information, wherein the system information comprises:
- a first parameter related to scheduling;
- a second parameter related to scheduling; and
- a third parameter related to timing advance;

transmitting, by the terminal, in a specific slot, a Physical Uplink Shared Channel (PUSCH) in response to a Random Access Response (RAR); and starting, by the terminal, in a first symbol, a contention resolution timer, wherein the specific slot is determined based on a sum of:
- a product of the first parameter related to scheduling and a first integer; and
- a second integer, wherein the first symbol is determined based on a sum of:
- the second parameter related to scheduling; and
- a first value related to timing advance, wherein the first value related to timing advance is determined based on a sum of:
- the third parameter related to timing advance; and
- a second value that is related to timing advance and estimated by the terminal, wherein the first integer is determined based on a subcarrier spacing, and wherein the second integer is determined based on a specific field in the RAR.

2. The method of claim 1, wherein the specific field is a time domain resource allocation field in an uplink grant field of the RAR.

3. The method of claim 1, wherein the second value is determined based on a first table in case that the first table is configured by the system information.

4. The method of claim 3, wherein contents of the first table are configurable.

5. The method of claim 1, wherein, in case that the first table is not configured by the system information, the second value is determined based on:
- a second table; and
- a PUSCH subcarrier spacing.

6. The method of claim 5, wherein contents of the second table are fixed.

7. The method of claim 1, wherein:

the contention resolution timer stops when a Physical Downlink Control Channel (PDCCH) addressed by a temporary Cell-Radio Network Temporary Identifier (C-RNTI) is received.

8. The method of claim 1, wherein the terminal monitors a Physical Downlink Control Channel (PDCCH) while the contention resolution timer is running.

9. The method of claim 1, wherein:

the first parameter is related to a service link; and the second parameter is related to a feeder link.

10. The method of claim 1, further comprising:

transmitting, by the terminal to a base station, a preamble to receive the RAR.

11. The method of claim 10, wherein the preamble is selected based on a specific Synchronization Signal Block (SSB).

12. The method of claim 11, Synchronization Signal-Reference Signal Received Power (SS-RSRP) of the specific SSB is above a rsrp-ThresholdSSB.

13. The method of claim 12, the rsrp-ThresholdSSB is indicated in the system information.

14. The method of claim 10, wherein the RAR is received in response to the preamble.

15. The method of claim 14, the RAR comprises:

a Timing Advance Command field;

an Uplink Grant field; and a Temporary Cell-Radio Network Temporary Identifier (C-RNTI) field.

16. The method of claim 15, the RAR is associated with a preamble identifier corresponding to the preamble transmitted.

17. The method of claim 1, wherein a Msg3 is transmitted in the PUSCH.

18. The method of claim 16, the Msg3 comprises a Radio Resource Control (RRC) message to request a connection setup.

19. A terminal in a wireless communication system, the terminal comprising:

a transceiver configured to transmit and receive a signal, and a controller configured to control the transceiver to:

receive system information, wherein the system information comprises:

a first parameter related to scheduling;

a second parameter related to scheduling; and a third parameter related to timing advance;

transmit, in a specific slot, a Physical Uplink Shared Channel (PUSCH) in response to a Random Access Response (RAR); and start, in a first symbol, a contention resolution timer, wherein the specific slot is determined based on a sum of:

a product of the first parameter related to scheduling and a first integer; and a second integer, wherein the first symbol is determined based on a sum of:

the second parameter related to scheduling; and a first value related to timing advance, wherein the first value related to timing advance is determined based on a sum of:

the third parameter related to timing advance; and a second value that is related to timing advance and estimated by the terminal, wherein the first integer is determined based on a subcarrier spacing, and wherein the second integer is determined based on a specific field in the RAR.

20. A method by a base station, the method comprising:

transmitting, by the base station, system information, wherein the system information comprises:

a first parameter related to scheduling;

a second parameter related to scheduling; and a third parameter related to timing advance;

receiving, by the base station, in a specific slot, a Physical Uplink Shared Channel (PUSCH) in response to a Random Access Response (RAR); and starting, by the base station, in a first symbol, a contention resolution timer, wherein the specific slot is determined based on a sum of:

a product of the first parameter related to scheduling and a first integer; and a second integer, wherein the first symbol is determined based on a sum of:

the second parameter related to scheduling; and a first value related to timing advance, wherein the first value related to timing advance is determined based on a sum of:

the third parameter related to timing advance; and a second value that is related to timing advance and estimated by the base station, wherein the first integer is determined based on a subcarrier spacing, and wherein the second integer is determined based on a specific field in the RAR.

* * * * *